United States Patent
Zhu

(10) Patent No.: US 12,501,416 B2
(45) Date of Patent: Dec. 16, 2025

(54) BWP MEASUREMENT AND REPORTING METHOD AND DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 409 days.

(21) Appl. No.: 18/006,115

(22) PCT Filed: Aug. 5, 2020

(86) PCT No.: PCT/CN2020/107168
§ 371 (c)(1),
(2) Date: Jan. 19, 2023

(87) PCT Pub. No.: WO2022/027339
PCT Pub. Date: Feb. 10, 2022

(65) Prior Publication Data
US 2023/0337207 A1     Oct. 19, 2023

(51) Int. Cl.
*H04W 72/0457*     (2023.01)
*H04W 72/232*     (2023.01)

(52) U.S. Cl.
CPC ..... *H04W 72/0457* (2023.01); *H04W 72/232* (2023.01)

(58) Field of Classification Search
CPC ........... H04W 72/0457; H04W 72/232; H04W 72/542; H04W 72/0453; H04W 36/0094; H04W 36/06; H04W 84/06; H04L 5/0007; H04L 5/0092
See application file for complete search history.

(56) References Cited

U.S. PATENT DOCUMENTS

| | | | | |
|---|---|---|---|---|
| 10,863,571 | B2* | 12/2020 | Cirik | H04W 24/08 |
| 11,140,722 | B2* | 10/2021 | Cirik | H04W 74/006 |
| 11,323,235 | B2* | 5/2022 | Jiang | H04L 5/001 |
| 11,765,720 | B2* | 9/2023 | Lee | H04W 72/0453 370/329 |
| 2019/0166555 | A1* | 5/2019 | Cheng | H04W 72/542 |
| 2019/0208548 | A1* | 7/2019 | Shih | H04L 5/0053 |
| 2021/0243808 | A1* | 8/2021 | Deenoo | H04W 74/002 |
| 2021/0399821 | A1* | 12/2021 | Chung | H04L 5/14 |

FOREIGN PATENT DOCUMENTS

| | | |
|---|---|---|
| CN | 109391965 A | 2/2019 |
| CN | 110519793 A | 11/2019 |
| CN | 110545562 A | 12/2019 |

OTHER PUBLICATIONS

International Search Report and Written Opinion of International Application No. PCT/CN2020/107168, mailed Apr. 25, 2021, 17 pages.

* cited by examiner

*Primary Examiner* — Rasheed Gidado
(74) *Attorney, Agent, or Firm* — Finnegan, Henderson, Farabow, Garrett & Dunner, L.L.P.

(57) ABSTRACT

A method for reporting bandwidth part (BWP) measurement is performed by a terminal, and includes: measuring signal qualities of reference signals of N BWPs within a BWP set; and in response to a reporting condition being satisfied, reporting measurement results of M BWPs to a network device, wherein the M BWPs are selected from the N BWPs based on the signal qualities; wherein N is an integer greater than 1, and M is an integer not greater than N.

18 Claims, 3 Drawing Sheets

---

220
measuring signal qualities of reference signals of N BWPs within a BWP set 240
in response to a reporting condition being satisfied, reporting measurement results of M BWPs to a network device, wherein the M BWPs are selected from the N BWPs based on the signal qualities

BWP MEASUREMENT AND REPORTING METHOD AND DEVICE

CROSS-REFERENCE TO RELATED APPLICATION

This application is the U.S. national phase application of International Application No. PCT/CN2020/107168, filed on Aug. 5, 2020, the entire disclosure of which is incorporated herein by reference.

TECHNICAL FIELD

The disclosure relates to a field of wireless communication, in particular to a method and an apparatus for reporting bandwidth part (BWP) measurement, a device, and a medium.

BACKGROUND

In order to support a variety of services and different forms of terminals, a bandwidth part (BWP) concept is introduced in a new radio (NR) system.

The terminal receives a downlink signal on a downlink BWP and sends an uplink signal on an uplink BWP within a certain period of time. In satellite communication as shown in FIG. 1, different areas are covered with different beams by satellites in order to improve a signal strength, and each area may be called a beam footprint, different beams and different frequency domain resources are usually used by different beam footprints in order to avoid co-channel interference. Similarly, in order to avoid interference between different satellites, when different satellites cover the same location on the ground, different frequency domain resources also need to be used. These different beams may be different BWPs (BWPs within a cell) or different cells.

How to measure and report multiple MVPs and realize fast switching is a technical problem to be solved urgently.

SUMMARY

According to a first aspect of the disclosure, a method for reporting BWP measurement is performed by a terminal. The method includes:
measuring signal qualities of reference signals of N BWPs within a BWP set; and
in response to a reporting condition being satisfied, reporting measurement results of M BWPs to a network device, in which the M BWPs are selected from the N MVPs based on the signal qualities;
N is an integer greater than 1, and M is an integer not greater than N.

According to a second aspect of the disclosure, a method for reporting BWP measurement is performed by a network device. The method includes:
receiving measurement results of M BWPs reported by a terminal;
The measurement results of the M BWPs are reported in response to a reporting condition being satisfied after the terminal measures signal qualities of reference signals of N BWPs in a BWP set and the M BWPs are selected by the terminal from the N BWPs based on the signal qualities, where N is an integer greater than 1, and M is an integer not greater than N.

According to a third aspect of the disclosure, a terminal is provided, which includes a processor; a transceiver connected to the processor; and a memory for storing instructions executable by the processor. When the instructions are executed by the processor, the processor is caused to measure signal qualities of reference signals of N BWPs within a BWP set; and in response to a reporting condition being satisfied, report measurement results of M BWPs to a network device, in which the M BWPs are selected from the N BWPs based on the signal qualities. N is an integer greater than 1, and M is an integer not greater than N.

BRIEF DESCRIPTION OF THE DRAWINGS

The accompanying drawings are briefly introduced below. The drawings in the following description are only used to illustrate example embodiments of the disclosure. For those skilled in the art, other embodiments may also be obtained.

DETAILED DESCRIPTION

In order to make the purpose, technical solution and advantages of the disclosure clearer, the implementations of the disclosure may be further described in detail below in conjunction with the accompanying drawings.

Figure 1:
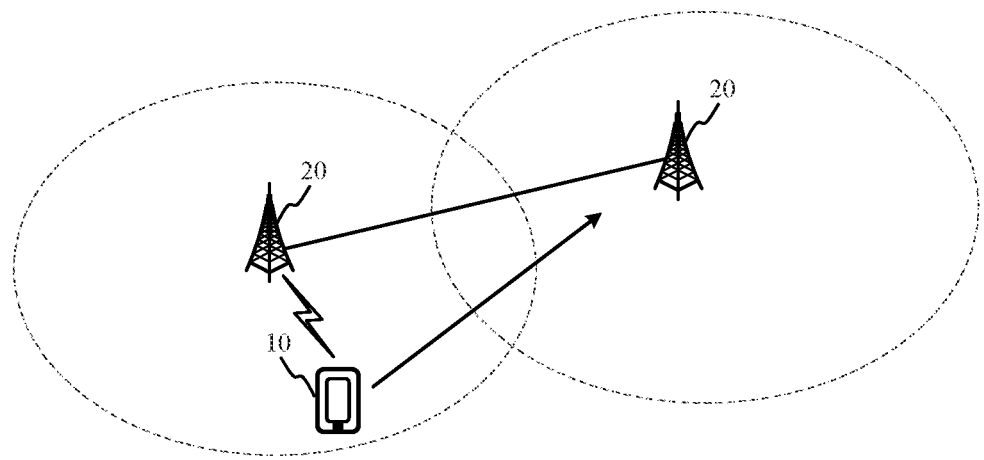
FIG. 1 is a network architecture diagram of a communication system according to an embodiment of the disclosure.

FIG. 1 illustrates a schematic diagram of a system architecture according to an embodiment of the disclosure. The system architecture may include: a terminal 10 and a network device 20.

There are generally multiple terminals 10, and one or more terminals 10 may be distributed in a cell managed by each network device 20. The terminal 10 may include various handheld devices, vehicle-mounted devices, wearable devices, computing devices or other processing devices connected to a wireless modem with wireless communication functions, as well as various forms of user equipment (UE), mobile stations (MS) and so on. For convenience of description, the above-mentioned devices in the embodiment of the disclosure are collectively referred to as terminals.

The network device 20 is a device deployed in an access network to provide a wireless communication function for the terminal 10. The network device 20 may include various forms of macro base stations, micro base stations, relay stations, access points and so on. In systems using different radio access technologies, the names of devices with network device functions may be different. For example, they in 5G new radio (NR) systems are called uNodeB or gNB. The term "network device" may change as the communication technology evolves. For the convenience of description, the above-mentioned devices that provide the wireless communication function for the terminal 10 in the embodiment of the disclosure are collectively, referred to as network devices.

The "5G NR system" in the embodiment of the disclosure may also be referred to as a 5G system or an NR system. The NR system may be a communication system supporting NR-Unlicensed (NR-U) or a non-terrestrial network (NTN), the meaning of which may be understood by those skilled in the art. The technical solution described in the embodiments of the disclosure may be applicable to the 5G NR system, and may also be applicable to a subsequent evolution system of the 5G NR system.

Figure 2:
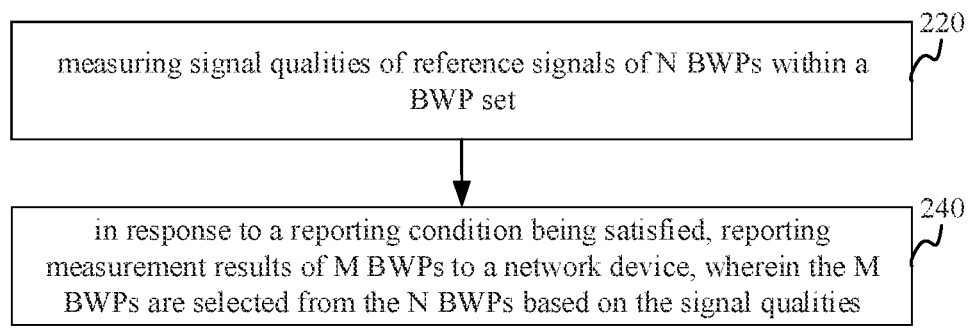
FIG. 2 is a flowchart of a method for reporting BWP measurement according to an embodiment of the disclosure.

FIG. 2 illustrates a flowchart of a method for reporting BWP measurement according to an embodiment of the disclosure. This method may be executed by the terminal 10 shown in FIG. 1. The method includes the following steps.

At 220: signal qualities of reference signals of N BWPs are measured within a BWP set.

The B-WP set includes at least two BWPs, and at least one BWP is an inactive BWP.

The reference signal includes: at least one of synchronization signal block (SSB) and channel-state information reference signal (CSI-RS).

The signal qualities of the reference signal includes: at least one of reference signal received power (RSRP), reference signal received quality (RSRQ), signal to interference and noise ratio (SINR).

Optionally, the terminal is one in the NTN system.

At 240: when a reporting condition is satisfied, measurement results of M BWPs are reported to a network device, in which the M BWPs are selected from the N BWPs based on the signal qualities;

N is an integer greater than 1, and M is an integer not greater than N.

Optionally, the measurement results of the M BWPs include: indexes of the M BWPs; or indexes of the M BWPs and signal qualities of the M BWPs.

To sum up, the method according to the embodiment may realize the activation reporting of the inactive BWP by reporting the measurement results of the M BWPs to the network device by the terminal, thus supporting fast BWP switching in a high-speed mobile satellite scenario.

Figure 3:
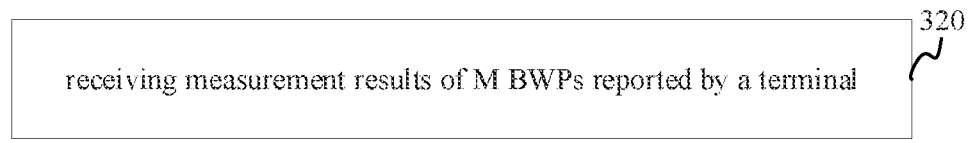
FIG. 3 is a flowchart of a method for reporting BWP measurement according to an embodiment of the disclosure.

FIG. 3 illustrates a flowchart of a method for reporting BWP measurement according to an embodiment of the disclosure. The method may be executed by the network device 20 shown in FIG. 1. The method includes the following step.

At 320: measurement results of M BWPs reported by a terminal are received;
  indexes of the M BWPs are reported by the terminal when a reporting condition is satisfied after the terminal measures signal qualities of reference signals of N BWPs in a BWP set, and the M BWPs are selected by the terminal from the N BWPs based on the signal qualities, where N is an integer greater than 1, and M is an integer not greater than N.

The BWP set includes at least two BWPs, and at least one BWP is an inactive BWP.

The reference signal includes: at least one of SSB and CSI-RS.

The signal qualities of the reference signal includes: at least one of RSRP, RSRQ and SINR.

Optionally, the terminal is one in the NTN system.

To sum up, the method according to the embodiment may realize the activation reporting of the inactive BWP by reporting the measurement results of the M BWPs to the network device by the terminal, thus supporting fast BWP switching in a high-speed mobile satellite scenario.

Figure 4:
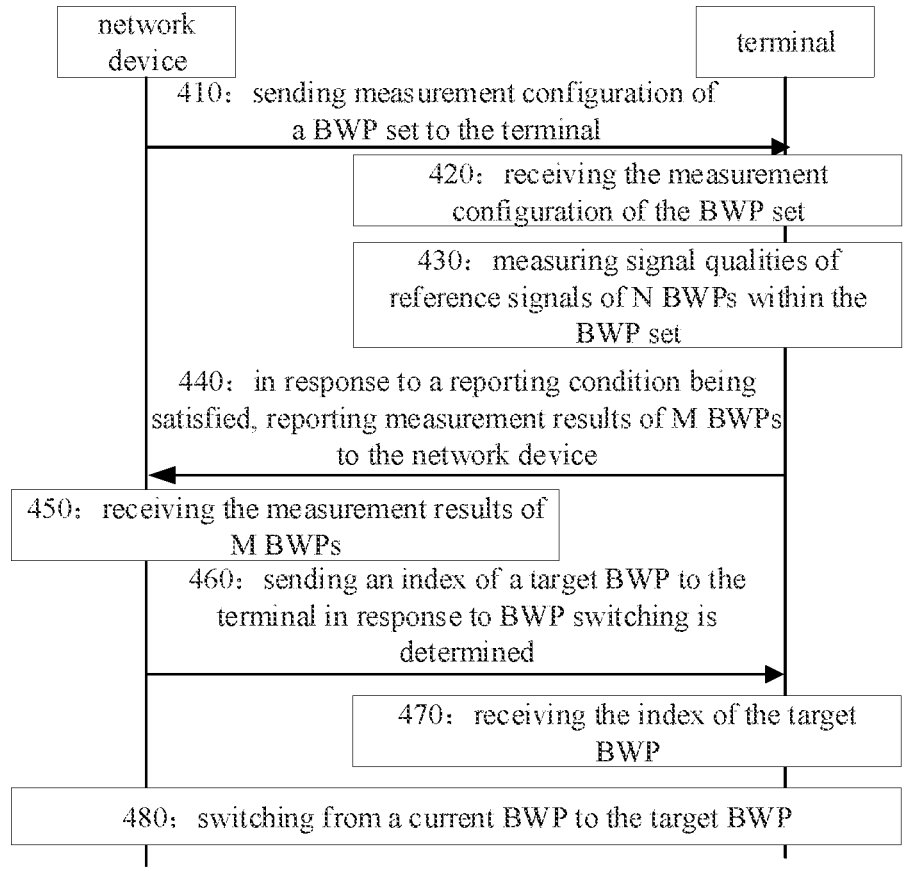
FIG. 4 is a flowchart of a method for reporting BWP measurement according to an embodiment of the disclosure.

FIG. 4 illustrates a flowchart of a method for reporting BWP measurement according to another embodiment of the disclosure. The method may be executed by the communication system shown in FIG. 1. The method includes the following steps.

At 410: a network device sends measurement configuration of a BWP set to a terminal.

The measurement configuration is configuration information for configuring a measurement way of the BWP set. Optionally, the BWP set includes at least two BWPs, and at least one BWP is an inactive MVP.

The measurement configuration includes: at least one of a measurement object and a reporting way.

The measurement object includes at least one of the following information:
  indexes of N BWPs in the BWP set;
  reference signals to be measured;
  a number NI of reported BWPs.

The reporting way includes at least one of the following information:
  Periodic reporting;
  The periodic reporting is a way of reporting for multiple times according to a certain reporting period. The parameters for periodic reporting include at least one of: a reporting period, a start reporting time, a maximum number of times for reporting, and the like.

Optionally, the way of the periodic reporting is configured by a high-layer signaling.

Triggered reporting.

The triggered reporting is a way of reporting after the terminal receives a reporting trigger instruction.

Optionally, the reporting trigger instruction is carried in physical layer downlink control information (DCI) sent by the network device to the terminal.

At 420: The terminal receives the measurement configuration of the BWP set from the network device.

At 430: The terminal measures signal qualities of reference signals of N BWPs in the BWP set.

According to the measurement configuration, the terminal measures the signal qualities of the reference signals of the N BWPs in the BWP set. The BWP set includes at least two BWPs, and at least one BWP is an inactive BWP.

The reference signal includes: at least one of SSB and CSI-RS.

The signal qualities of the reference signal includes: at least one of RSRP, RSRQ and SINR.

At 440: The terminal reports the measurement results of M BWPs to the network device when the reporting condition is satisfied:

The M BWPs are selected from the N BWPs according to the signal qualities. For example, the M BWPs are those with the best channel quality among the N BWPs.

Optionally, the reference signal includes: at least one of SSB and CSI-RS. The signal quality of the reference signal includes: at least one of RSRP, RSRQ and STAR.

The terminal reports the measurement results of the M BWPs to the network device through physical layer uplink control information (UCI).

In an example, the terminal reports the measurement results of M BWPs to the network device when a periodic reporting condition is satisfied. In another example, the terminal reports the measurement results of the M BWPs to the network device when the reporting trigger instruction in the DCI is received.

Optionally, the measurement results of the M BWPs include: indexes of the M BWPs; or, indexes of the M BWPs and signal qualities of the M BWPs.

In an example, the signal qualities of the M BWPs is carried in an explicit manner. In another example, the signal qualities of the M BWPs is carried in an implicit manner, which is implicitly indicated by a sorting order of the indexes of the M BWPs.

At 450: The network device receives the measurement results of M BWPs reported h the terminal.

The network device receives the UCI sent by the terminal, and obtains the measurement results of M BWPs from the UCI. The network device determines whether the terminal needs to switch a BWP according to the measurement results of the M BWPs.

At 460: the network device sends an index of a target BWP to the terminal when BWP switching is determined.

Optionally, the target BWP is one of the M BWPs.

The index of the target BWP is carried by a cell common signaling, a group signaling or a UE specific signaling. The UE specific signaling includes: any one of a radio resource control (RRC) message, a medium access control-control element (MAC-CE) and physical layer downlink control information (DCIS.

That is, the network device sends the cell public signaling to the terminal, such as through a system broadcast; in which the index of the target BWP is carried in the cell public signaling; the network device sends the group signaling to the terminal, in which the index of the target BWP is carried in the group signaling; The network device sends the UE specific signaling to the terminal, in which the index of the target BWP is carried in the UE specific signaling.

At 470: The terminal receives the index of the target BWP sent by the network device.

Correspondingly, the terminal receives the cell public signaling sent by the network device, such as through a system broadcast, in which the index of the target BWP is carried in the cell public signaling; the terminal receives the group signaling sent by the network device, in which the index of the target BWP is carried in the group signaling; the terminal receives the UE specific signaling sent by the network device, in which the index of the target BWP is carried in the UE specific signaling.

At 480: The network device and the terminal device switch from a current BWP to the target BWP.

Optionally, the terminal switches from the current BWP to the target BWP after a duration T from receiving the index of the target BWP, where T is a time offset value. The network device switches from the current BWP to the target BWP after a duration T from sending the index of the target BWP. The current BWP is also called a source BWP, and the target BWP is also called a destination BWP.

Optionally, the time offset value T is predefined or pre-configured by the network device. When the time offset value T is predefined by a communication protocol, the network device and the terminal obtain the predefined time offset value T. When the time offset value T is pre-configured by the network device, the network device configures in advance the time offset value T for the terminal, the terminal receives the time offset value T configured by the network device.

To sum up, the method according to the embodiment may realize the activation reporting of the inactive BWP by reporting the measurement results of M BWPs to the network device by the terminal, thus supporting fast BWP switching in a high-speed mobile satellite scenario.

In the method according to the embodiment, the network device and the terminal switch from the current BWP to the target BWP after the duration T from receiving the index of the target BWP, so that the network device and the terminal may switch from the current BWP to the target BWP at the same time.

Figure 5:
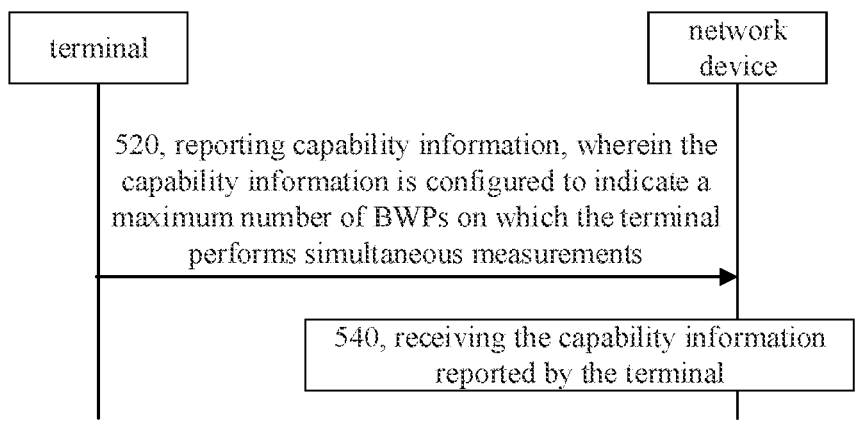
FIG. 5 is a flowchart of a method for reporting BWP measurement according to an embodiment of the disclosure.

Based on the embodiment shown in FIG. 2 or FIG. 3 or FIG. 4, the above method further includes the following steps as shown in FIG. 5.

At 520: The terminal reports capability information to the network device, in which the capability information is configured to indicate a maximum number of BWPs on which the terminal performs simultaneous measurements.

At 540: The network device receives the capability information reported by the terminal.

Optionally, the network device determines the BWP set according to the capability information.

To sum up, the method according to the embodiment may realize the activation reporting of the inactive BWP by reporting the measurement results of M BWPs to the network device by the terminal, thus supporting fast BWP switching in the high-speed mobile satellite scenario.

Figure 6:
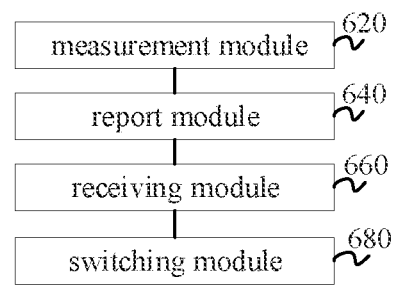
FIG. 6 is a block diagram of an apparatus for reporting BWP measurement according to an embodiment of the disclosure.

FIG. 6 illustrates a block diagram of an apparatus for reporting BWP measurement according to an embodiment of the disclosure. The apparatus may be applied in a terminal. The apparatus includes a measurement module 620 and a report module 640.

The measurement module 620 is configured to measure signal qualities of reference signals of N BWPs within a BWP set.

The report module 640 is configured to report measurement results of M BWPs to a network device in response to a reporting condition being satisfied, in which the M BWPs are selected from the N BWPs based on the signal qualities.

N is an integer greater than 1, and M is an integer not greater than N.

In an optional embodiment of the disclosure, the reporting module 640 is configured to report the measurement results of the M BWPs to the network device in response to a periodic reporting condition being satisfied; or the reporting module 640 is configured to report the measurement results of the M BWPs to the network device in response to receiving a reporting trigger instruction in a physical layer downlink control information (DCI) signaling.

In an optional embodiment of the disclosure, the measurement results are carried in physical layer uplink control information (UCI).

In an optional embodiment of the disclosure, the measurement results of the M BWPs include: indexes of the M MVPs; or indexes of the M BWPs and signal qualities of the M BWPs.

In an optional embodiment of the disclosure, the apparatus further includes a receiving module 660.

The receiving module 660 is configured to receive measurement configuration of the BWP set by the network device.

In an optional embodiment of the disclosure, the measurement configuration includes at least one of the following measurement parameters: indexes of the N BWPs in the BWP set; reference signals to be measured; and a number M of reported BWPs.

In an optional embodiment of the disclosure, the apparatus further includes a receiving module 660 and a switching module 680.

The receiving module 660 is configured to receive an index of a target BWP sent by the network device.

The switching module 680 is configured to switch from a current BWP to the target BWP.

In an optional embodiment of the disclosure, the index of the target BWP is carried by a cell common signaling, a group signaling or a UE specific signaling.

In an optional embodiment of the disclosure, the switching module 680 is configured to switch from the current BWP to the target BWP after a duration T from receiving the index of the target BWP, where T is a time offset value.

In an optional embodiment of the disclosure, the apparatus further includes: a receiving module 660; configured to receive the time offset value T sent by the network device; or the switching module 680, configured to obtain a predefined time offset value T.

In an optional embodiment of the disclosure; the report module 640 is further configured to report capability information to the network device, in which the capability information is configured to indicate a maximum number of BWPs on which the terminal performs simultaneous measurements.

Figure 7:
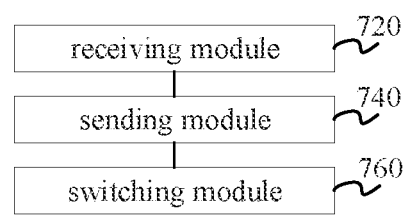
FIG. 7 is a block diagram of an apparatus for reporting BWP measurement according to an embodiment of the disclosure.

FIG. 7 illustrates a block diagram of an apparatus for reporting BWP measurement according to an embodiment of the disclosure. The apparatus may be applied to a network device. The apparatus includes a receiving module 720.

The receiving module 720 is configured to receive measurement results of M BWPs reported by a terminal.

The measurement results of the M BWPs are reported in response to a reporting condition being satisfied after the terminal measures signal qualities of reference signals of N BWPs in a BWP set, and the M BWPs are selected by the terminal from the N BWPs based on the signal qualities, where N is an integer greater than 1, and M is an integer not greater than N.

In an optional embodiment of the disclosure, the apparatus further includes a sending module 740.

The sending module 740 is configured to configure a periodic reporting condition to the terminal through a high-layer signaling; or the sending module 740 is configured to send physical layer downlink control information (DCI) to the terminal, and trigger BWP measurement reporting through the DCI.

In an optional embodiment of the disclosure, the measurement results are carried in physical layer uplink control information (UCI).

In an optional embodiment of the disclosure, the measurement results of the M BWPs include: indexes of the M BWPs; or indexes of the M MVPs and signal qualities of the M BWPs.

In an optional embodiment of the disclosure, the sending module 740 is configured to send measurement configuration of the BWP set to the terminal.

In an optional embodiment of the disclosure, the measurement configuration includes at least one of the following measurement parameters: indexes of the N BWPs in the BWP set; reference signals to be measured; and a number M of reported BWPs.

In an optional embodiment of the disclosure, the sending module 740 is configured to send an index of a target BWP to the terminal when BWP switching is determined.

In an optional embodiment of the disclosure, the index of the target BWP is carried h a cell common signaling, a group signaling or a LIE specific signaling.

In an optional embodiment of the disclosure, the apparatus further includes a switching module 760.

The switching module 760 is configured to switch from the current BWP to the target BWP for communication with the terminal after a duration T from sending the index of the target BWP, where T is a time offset value.

In an optional embodiment of the disclosure, the apparatus further includes a sending module 740.

The sending module 740 is configured to send the time offset value T to the terminal.

In an optional embodiment of the disclosure, the receiving module 720 is configured to receive capability information reported by the terminal, in which the capability information is configured to indicate a maximum number of BWPs on which the terminal performs simultaneous measurements.

Figure 8:
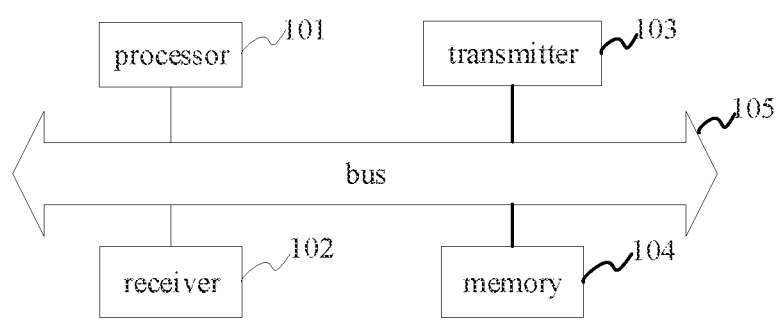
FIG. 8 is a structural schematic diagram of a communication device according to an embodiment of the disclosure.

FIG. 8 illustrates a structural schematic diagram of a communication device (network device or terminal) according to an exemplary embodiment of the disclosure. The communication device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as a communication assembly, which may be a communication chip.

The memory 104 is connected to the processor 101 through the bus 105.

The memory 104 may be used to store at least one instruction, and the processor 101 is used to execute the at least one instruction, so that various steps in the above method embodiments are implemented.

In addition, the memory 104 may be implemented by any type of volatile or non-volatile storage device or their combination. The volatile or non-volatile storage device includes but not limited to: a magnetic disk or an optical disk, an erasable programmable read only memory (EEPROM), an erasable programmable read only memory (EPROM), a static random access memory SRAM), a read only memory (ROM), a magnetic memory, a flash memory, a programmable read only memory (PROM).

In an exemplary embodiment, a computer-readable storage medium is also provided, storing at least one instruction, at least one program, a code set or an instruction set, which is loaded and executed by the processor to implement the method for reporting BWP measurement performed by the terminal or network device according to the above method embodiments.

Those skilled in the art may understand that all or part of the steps for implementing the above embodiments may be completed by hardware, and may also be completed by instructing related hardware through a program. The program may be stored in a computer-readable storage medium. The above-mentioned storage medium may be a ROM, a magnetic disk or an optical disk, and the like.

The technical solution according to the embodiments of the disclosure includes at least the following technical effects: by the measurement results of M BWPs reported by the terminal to the network device, the activation reporting of inactive BWPs may be achieved, thus supporting fast switching of BWPs in a high-speed mobile satellite scenario.

The above description is example embodiments of the disclosure, and is not intended to limit the disclosure. Any modifications, equivalent replacements, improvements, etc. made within the principles of the disclosure should be included within the protection scope of the disclosure.

What is claimed is:

1. A method for reporting bandwidth part (BWP) measurement, performed by a terminal, the method comprising:

measuring signal qualities of reference signals of N BWPs within a BWP set; and in response to a reporting condition being satisfied, reporting measurement results of M BWPs to a network device, wherein the measurement results of the M BWPs comprise indexes of the M BWPs and signal qualities of the M BWPs, the signal qualities of the M BWPs are implicitly indicated by a sorting order of the indexes of the M BWPs; wherein the M BWPs are selected from the N BWPs based on the signal qualities of the reference signals;

wherein N is an integer greater than 1, and M is an integer not greater than N.

2. The method according to claim 1, wherein in response to the reporting condition being satisfied, reporting measurement results of M BWPs to the network device comprises one of:

in response to a periodic reporting condition being satisfied, reporting the measurement results of the M BWPs to the network device; or in response to receiving a reporting trigger instruction in a physical layer downlink control information (DCI) signaling, reporting the measurement results of the M BWPs to the network device.

3. The method according to claim 1, wherein the measurement results are carried in physical layer uplink control information (UCI).

4. The method according to claim 1, further comprising: receiving measurement configuration of the BWP set from the network device.

5. The method according to claim 4, wherein the measurement configuration comprises at least one of:
indexes of the N BWPs in the BWP set;
reference signals to be measured; or
a number M of reported BWPs.

6. The method according to claim 1, further comprising:
receiving an index of a target BWP sent by the network device; and
switching from a current BWP to the target BWP,
wherein the index of the target BWP is carried by one of a cell common signaling, a group signaling, or a user equipment (UE) specific signaling.

7. The method according to claim 6, wherein switching from the current BWP to the target BWP comprises:
switching from the current BWP to the target BWP after a duration T from receiving the index of the target BWP, where T is a time offset value.

8. The method according to claim 1, further comprising:
reporting capability information to the network device, wherein the capability information is configured to indicate a maximum number of BWPs on which the terminal performs simultaneous measurements.

9. A method for reporting bandwidth part (BWP) measurement, performed by a network device, the method comprising:
receiving measurement results of M BWPs reported by a terminal, wherein the measurement results of the M BWPs comprise indexes of the M BWPs and signal qualities of the M BWPs, the signal qualities of the M BWPs are implicitly indicated by a sorting order of the indexes of the M BWPs;
wherein the measurement results of the M BWPs are reported in response to a reporting condition being satisfied after the terminal measures signal qualities of reference signals of N BWPs in a BWP set, and the M BWPs are selected by the terminal from the N BWPs based on the signal qualities of the reference signals, where N is an integer greater than 1, and M is an integer not greater than N.

10. The method according to claim 9, further comprising one of:
configuring a periodic reporting condition to the terminal through a high-layer signaling; or
sending physical layer downlink control information (DCI) to the terminal, and triggering BWP measurement reporting through the DCI.

11. The method according to claim 9, wherein the measurement results are carried in physical layer uplink control information (UCI).

12. The method according to claim 9, further comprising:
sending measurement configuration of the BWP set to the terminal.

13. The method of claim 12, wherein the measurement configuration comprises at least one of:
indexes of the N BWPs in the BWP set;
reference signals to be measured; or
a number M of reported BWPs.

14. The method according to claim 9, further comprising:
sending an index of a target BWP to the terminal in response to determining BWP switching,
wherein the index of the target BWP is carried by one of a cell common signaling, a group signaling, or a user equipment (UE) specific signaling.

15. The method according to claim 14, further comprising:
switching from a current BWP to the target BWP for communication with the terminal after a duration T from sending the index of the target BWP, where T is a time offset value.

16. The method according to claim 9, further comprising:
receiving capability information reported by the terminal, wherein the capability information is configured to indicate a maximum number of BWPs on which the terminal performs simultaneous measurements.

17. A network device, comprising:
a processor;
a transceiver connected to the processor; and
a memory for storing instructions executable by the processor;
wherein the processor is configured to perform the method of claim 9.

18. A terminal, comprising:
a processor;
a transceiver connected to the processor; and
a memory for storing instructions executable by the processor;
wherein the processor is configured to:
measure signal qualities of reference signals of N BWPs within a BWP set; and
in response to a reporting condition being satisfied, report measurement results of M BWPs to a network device, wherein the measurement results of the M BWPs comprise indexes of the M BWPs and signal qualities of the M BWPs, the signal qualities of the M BWPs are implicitly indicated by a sorting order of the indexes of the M BWPs, wherein the M BWPs are selected from the N BWPs based on the signal qualities of the reference signals;
wherein N is an integer greater than 1, and M is an integer not greater than N.

* * * * *